INVENTOR
CALVIN S. SMITH
BY C J Fraker
ATTORNEYS

United States Patent Office 3,435,590
Patented Apr. 1, 1969

3,435,590
CO₂ AND H₂S REMOVAL
Calvin S. Smith, El Cerrito, Calif., assignor to Chevron Research Company, San Francisco, Calif., a corporation of Delaware
Filed Sept. 1, 1967, Ser. No. 665,108
Int. Cl. B01d 49/00
U.S. Cl. 55—43                13 Claims

ABSTRACT OF THE DISCLOSURE

A process for removing $H_2S$ and/or $CO_2$ from a $H_2$-containing gas mixture fed to a low point in a $CO_2$ absorber. Cold, lean, liquid absorbent such as propylene carbonate, acetone or methanol is fed to an intermediate point in the absorber and flows downward in countercurrent contact with the gas mixture, thus absorbing $H_2S$ and/or $CO_2$ and cooling the $H_2$. Warm, lean, liquid absorbent is fed to an upper point in the absorber and flows downward in countercurrent contact with the cold $H_2$ at a point above the intermediate point, thus cooling the absorbent and warming the cold $H_2$. The absorbed gases are later removed by flashing and stripping.

BACKGROUND OF THE INVENTION

Field of the invention

The present invention relates to the selective removal of constituents, for example, carbon dioxide and hydrogen sulfide, from gaseous mixtures containing the same together with other gaseous components.

Prior art

A number of processes are now in use for effecting such removal, for example, washing (i.e., removing selected constituents by absorption) with water under pressure or with an alkanolamine or a caustic alkali solution. It is also known to separate carbon dioxide and hydrogen sulfide from crude gases by washing and simultaneous rectification at low temperatures, preferably between 0° F. and —100° F., in several stages where the wash liquid can also be regenerated by rectification.

The disadvantage of the known processes is that they are expensive. High capital investment for the initial plant and/or high operating costs are incurred. Recently, low temperature acid gas absorption processes using physical-absorption type absorbents have been put into commercial operation, achieving a reduction in operating costs compared to traditional acid gas absorption using chemisorption-type absorbents, such as monoethanolamine. But the capital investment for the low temperature processes is comparatively high.

The capital investment is particularly high when it is desired to separate gases, such as $CO_2$, from $H_2$ at high pressures using low temperature gas absorption processes. The high capital cost is largely due to expensive high pressure heat exchangers used to cool the feed gas to the absorption column. According to present processes, typically the warm feed gas is cooled by heat exchange against cold purified gas leaving the top of the low temperature absorber and/or cold, low pressure $CO_2$ which has been selectively separated from the $H_2$. Because the heat exchange is thus generally gas to gas, relatively low heat transfer coefficients are obtained. This results in a requirement for heat exchangers with large heat transfer areas. These large heat exchangers are expensive at moderate pressures and very expensive at high pressures.

SUMMARY OF THE INVENTION

According to the present invention, in a process for removing $CO_2$ from a $CO_2$-rich gas stream containing components having boiling points lower than $CO_2$, wherein the $CO_2$-rich gas stream is fed to a lower point in an absorber and $CO_2$ is absorbed by a downward flowing liquid absorbent at low temperatures and high pressures, the improvement is made which comprises:

(1) Feeding cold, lean, liquid absorbent to an intermediate point in the absorber;

(2) Feeding warm, lean, liquid absorbent to an upper point in the absorber; and (3) Directly contacting cold, $CO_2$-lean gas, flowing upward in the absorber past the intermediate point, with warm, lean, liquid absorbent flowing downward in the absorber so as to remove heat from the absorbent and warm the cold, $CO_2$-lean gas.

In the present process, because the cold, $CO_2$-lean gas is directly heat exchanged with warm, lean, liquid absorbent, the heat is transferred to the cold, $CO_2$-lean gas much more efficiently than in prior processes. The heat transfer coefficient is much improved not only because the cold, $CO_2$-lean gas is heat exchanged with liquid (as opposed to gas-gas heat exchange), but also because the heat exchange is effected by direct contact. The direct contact eliminates the decrease in the heat transfer coefficient due to the metal wall of the tube which is between the cold, lean gas and the warm fluid when using shell-and-tube heat exchangers according to prior processes.

Furthermore, the $CO_2$-rich gas stream is fed to the bottom of the absorber, warm, i.e., between 70 and 130° F., typically 100° F., and is cooled by direct heat exchange with the downward passing absorbent while at the same time $CO_2$ is condensed and also absorbed by the absorbent. Thus the large high pressure exchangers used according to prior processes to cool the feed gas are eliminated according to the present invention.

Due to the cold absorbent entering at an intermediate point, a cold pinch point is obtained in the $CO_2$-absorber and $CO_2$ is forced to leave the bottom of the absorber. The $CO_2$ laden absorbent mixture is withdrawn from the bottom of the absorber at relatively high temperatures, generally no more than 5 to 35° F. below the temperature of the feed gas. After a first reduction of pressure on the absorbent-$CO_2$ mixture withdrawn from the bottom of the absorber, heat is removed from the absorbent-$CO_2$ mixture at pressures substantially lower than the pressure of the feed gas, using cold low pressure $CO_2$ obtained by subsequent further reduction of the pressure on the absorbent-$CO_2$ mixture. Thus the gas to gas high presure heat exchange of feed gas against cold low pressure $CO_2$, as according to typical prior art processes, is avoided.

In the present invention, the absorbent is desirably a polar absorbent, and the absorption is effected at high pressure taking advantage of the increased solubility of $CO_2$ in the polar absorbent with increased pressure. In the process of the present invention, particularly when $H_2$ is contained in the feed gas and the $H_2$ is to be used in a high pressure hydroconversion process, it has been found economical to compress the $CO_2$-rich feed gas to above 900 p.s.i.g., usually above 1200 p.s.i.a., using centrifugal compressors. Using polar absorbents such as methanol, acetone or propylene carbonate at these high pressures results in a very efficient process for removing $CO_2$ from more volatile gases, such as $H_2$.

Thus, according to a preferred embodiment of the invention, there is provided a process for removing $CO_2$ from $H_2$ which comprises:

(1) Absorbing the $CO_2$ in an absorber with cold methanol so as to obtain a cold, $CO_2$-lean, $H_2$-rich gas stream and warm, $CO_2$-rich methanol;

(2) Reducing the pressure on the warm, $CO_2$-rich methanol to obtain a cold, gaseous $CO_2$-rich stream and cold, $CO_2$-lean liquid methanol;

(3) Heating and stripping further $CO_2$ from the cold, $CO_2$-lean liquid methanol to obtain warm, $CO_2$-lean liquid methanol;

(4) Feeding the warm, $CO_2$-lean liquid methanol to an upper section of the absorber; and (5) Directly contacting the cold, $CO_2$-lean, $H_2$-rich gas stream rising upward in the absorber with the warm, $CO_2$-lean liquid methanol flowing downward in the absorber.

The process of the present invention may be applied advantageously to puurification of raw hydrogen gas streams produced by reforming light hydrocarbons with $H_2O$. The raw hydrogen produced by reforming followed by CO shift conversion characteristically is about 80 percent $H_2$, 18 percent $CO_2$, 0.5 percent CO, and the balance light hydrocarbons, $N_2$, Argon, etc. When the raw hydrogen is produced by reforming light hydrocarbons, centrifugal compression of the raw hydrogen to high pressures as referred to above is particularly advantageous, as the raw hydrogen is generally obtained from the reforming step at pressures below 900 p.s.i.a., generally about 100–300 p.s.i.a. according to most currently used commercial processes.

The gas separation process of the present invention may also be advantageously applied to purification of raw hydrogen gas streams produced by partial oxidation of a wide range of hydrocarbons, such as coal, petroleum residual fractions, heavy hydrocarbons, and light hydrocarbons. The raw hydrogen produced by partial oxidation followed by CO shift conversion characteristically is about 60 percent $H_2$, 25 percent $CO_2$, 2 percent CO, 2 percent $H_2S$ and the balance light hydrocarbons $N_2$, argon, etc. It is usually desirable to remove the $H_2S$ as well as the $CO_2$ from the raw hydrogen produced. Thus according to a preferred embodiment of the invention, there is provided a process for removing $CO_2$ and $H_2S$ from an $H_2$-containing feed gas which comprises:

(1) Absorbing the $CO_2$ and $H_2S$ in an absorber with cold, $CO_2$, $H_2S$-lean methanol obtained as described in Step 2, so as to obtain a cold, $CO_2$, $H_2S$-lean, $H_2$-rich gas stream and warm, $CO_2$, $H_2S$-rich methanol;

(2) Reducing the pressure on the warm, $CO_2$, $H_2S$-rich methanol so as to obtain a cold, gaseous $CO_2$ and $H_2S$ stream, and the cold, $CO_2$, $H_2S$-lean methanol used to absorb $CO_2$ and $H_2S$;

(3) Scrubbing $H_2S$ from the cold, gaseous $CO_2$ and $H_2S$ stream using lean methanol obtained as described in Step 4, so as to obtain a $CO_2$-rich, gaseous stream and $H_2S$-rich methanol;

(4) Rectifying the $H_2S$-rich methanol to obtain the lean methanol used to scrub $H_2S$ and a gaseous $H_2S$-rich stream and a warm, $CO_2$, $H_2S$-lean methanol stream;

(5) Directly contacting the cold, $CO_2$, $H_2S$-lean, $H_2$-rich gas stream rising upward in the absorber with the warm, $CO_2$, $H_2S$-lean methanol stream flowing downward in the absorber.

DETAILED DESCRIPTION

Figure 1:
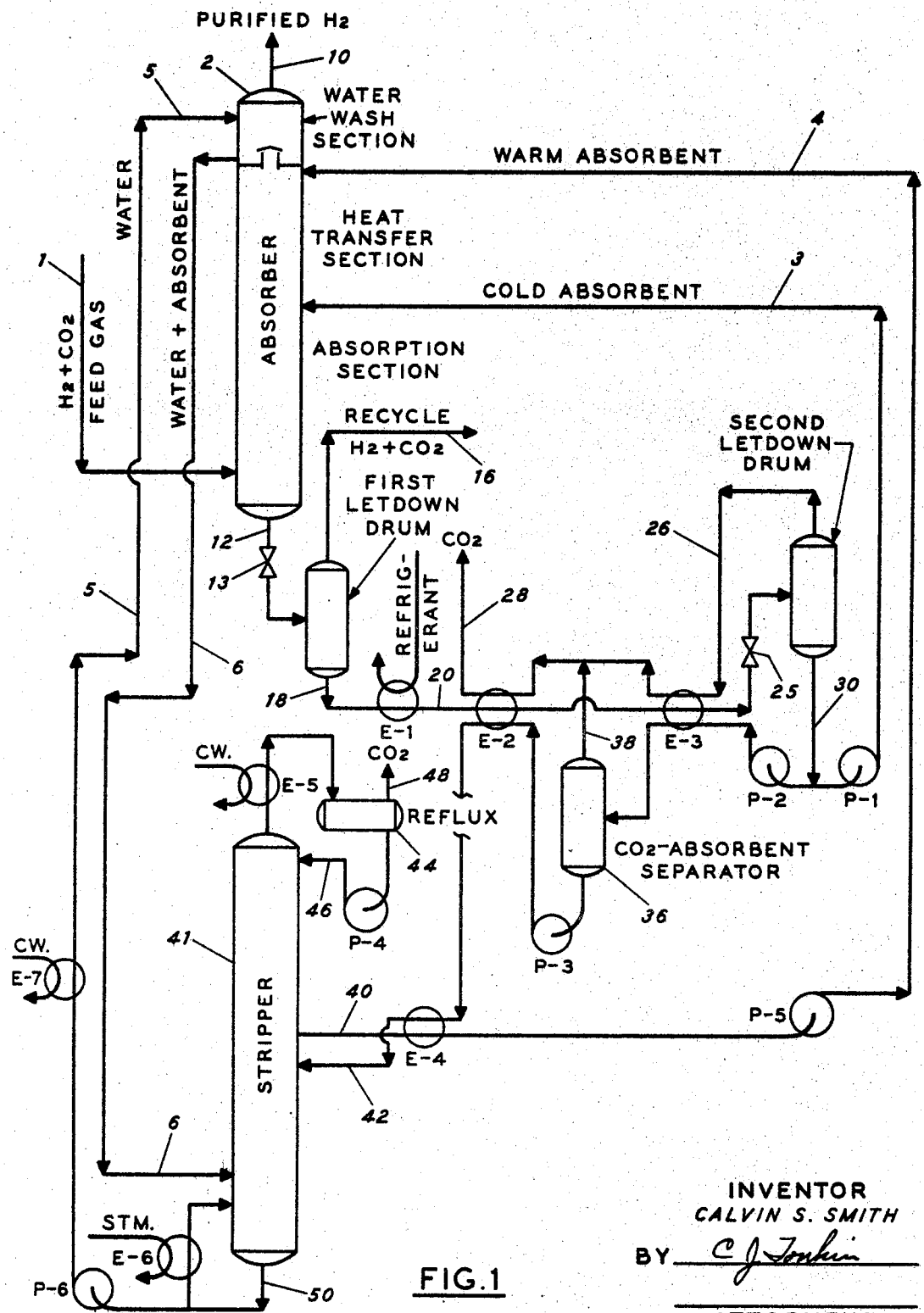
FIGURE 1 is a schematic illustration of the process of the present invention as applied to a feed gas comprising hydrogen and $CO_2$.

Referring now in more detail to FIGURE 1, feed gas comprising hydrogen and $CO_2$ obtained, for example, from a steam-methane reforming process followed by shift conversion of CO to hydrogen and $CO_2$, and then followed by centrifugal compression from about 250 p.s.i.a. to about 1,500 p.s.i.a. and cooling to 100° F. by a water cooled heat exchanger, is fed in line 1 to a lower point in absorber 2. At this 100° F. hydrogen plus $CO_2$ feed gas fed to the bottom of absorber 2 rises upward in the absorption section of the absorber, cold absorbent in line 3 absorbs $CO_2$ from the feed gas and cools the feed gas to within about 5 to 30° F. of the cold absorbent entrance temperature at an intermediate point of the absorber. The cold absorbent fed to the absorber in line 3, for purposes of example—methanol, is at a temperature between minus 30 and minus 110° F., typically minus 90° F.

Cold, $CO_2$-lean gas passes upward from the absorption section and into the heat transfer section of the absorber. This cold, $CO_2$-lean gas is directly contacted with warm, $CO_2$ free methanol entering the column at an upper point of the absorber as indicated by line 4, in FIGURE 1, at a temperature between 50° and 110° F., typically about 80° F. Thus the cold, $CO_2$-lean gas rising upward from the absorption section is warmed by the warm methanol entering the absorber at the top of the heat transfer section.

Although the center portion of the column is referred to as a heat transfer section, there is also $CO_2$ absorption occurring in the heat transfer section, particularly as the $CO_2$-lean solvent is cooled. Also in the absorption section of the absorber there is, of course, a considerable amount of direct contact heat transfer between the cold absorbent entering in line 3 and the warm feed gas entering in line 1.

Because a small fraction of the warm absorbent vaporizes and is carried upward in the column by the $CO_2$-lean gas passing upward from the heat transfer section, a water wash section is provided in the uppermost part of the absorber. Water in line 5 washes downward in the water wash section of the absorption column, thus washing down vaporized and entrained absorbent leaving the heat transfer section of the absorber. The water also serves to remove still further amounts of $CO_2$ from the feed gas because of the very low concentration of $CO_2$ in the water used for the water wash section.

In the water wash section, as well as the heat transfer section and the absorption section of the absorber, bubble cap trays are one preferred means of providing good contact between the rising gas and the downward flowing liquid. Other standard type contacting means, such as sieve trays, packing, etc., may be used. More particularly, in the heat transfer section, it is advantageous to have a contacting means that will provide a relatively high contact area per vertical length of the absorber. Thus packing, such as Glitsch Grid, may advantageously be used in the heat transfer section. Water containing washed out absorbent and a small amount of soluble $CO_2$ is withdrawn at the bottom of the water wash section through line 6 and passed to the lower part of stripper 41. Purified hydrogen is withdrawn from the top of the absorber in line 10 at about 70° F.

Because the purified $H_2$ withdrawn from the top of the absorber still contains some CO (between about 0.5–3.0 percent), one preferred embodiment of the present invention is to withdraw the $H_2$,CO gas at between 15° and 45° F., generally about 35° F., and pass the $H_2$, CO gas to a Cuprous Ammonium Acetate (CAA) CO absorption system operating under refrigeration. An added advantage of withdrawing the $H_2$, CO gas at about 35° F. is reduced methanol vaporization, thus allowing the water wash section to be eliminated or reduced.

$CO_2$-rich absorbent, for example methanol, is withdrawn from the bottom of the absorber in line 12 and passed through pressure reduction valve 13 and into the first letdown drum. The pressure on the rich methanol absorbent is reduced from about 1,500 p.s.i.a. to between 400 and 1,200 p.s.i.a., generally to about 500 p.s.i.a. For a 100M s.c.f.d. $H_2$ production rate, the $H_2$ and $CO_2$ stream which flashes off from the methanol and is withdrawn in line 16 is about 4.6M s.c.f.d., consisting of about 63 volume percent $H_2$, 27 percent $CO_2$, and the balance light hydrocarbons, CO, argon, $N_2$, etc. The gases withdrawn in line 16 are recycled to join the feed gas in line 1.

Methanol withdrawn in line 18 from the bottom of the first letdown drum at about 75° F. is cooled by refrigerant in heat exchanger E-1. The refrigeration duty is relatively small (only a few million B.t.u.'s per hour for a hydrogen production rate of one hundred million standard cubic feet per day). Methanol withdrawn from E-1 in line 20 is further cooled in E-2 and E-3 and then is flashed across pressure reduction valve 25 into the second letdown drum at a pressure between about 3 and 25 p.s.i.a. Temperature in the second letdown drum is about minus 90° F. As an alternative to pressure reduction valves 13 and 25, expansion turbines could be used to recover power.

$CO_2$ withdrawn in line 26 from the top of the letdown drum is used to remove heat from the rich methanol absorbent passed through the heat exchangers E-1 and E-2 via line 20. The $CO_2$ is withdrawn in line 28 at about 60° F. Although refrigerant is shown as passing through a separate exchanger E-1 in the schematic flow diagram, the refrigerant may advantageously be passed through E-2 thus combining E-1 and E-2 into a single consolidated heat exchange unit. Since it is desired to flash large amounts of $CO_2$ out of the absorbent in the second letdown drum and because $CO_2$ is very soluble in methanol at temperatures as low as minus 90° F., the partial pressure of $CO_2$ above the cold methanol must be reduced below about 15 p.s.i.a.

The cold, lean absorbent is withdrawn from the bottom of the second letdown drum in line 30 and passed in part through pump P-1 to be fed via line 3 to the absorber. The balance of the absorbent is passed via P-2 through exchanger E-3 into $CO_2$ absorbent separator 36. Because the cold absorbent passed via P-2 through exchanger E-3 is heated in exchanger E-3, $CO_2$ will be liberated from the absorbent upon entering separator 36. This cold $CO_2$ at about 0° F. is removed from the top of the separator 36 in line 38 and is passed through E-2 to join effluent $CO_2$ in line 28.

Absorbent from the bottom of separator 36 is passed through exchanger E-2 and is thereby heated to about 70° F. It is then exchanged against warm, lean methanol at about 180° F. in line 40 by countercurrent passage through exchanger E-4. The methanol from separator 36 which has been heated in E-2 and E-4 is passed at about 170° F. in line 42 to stripper 10. The stripper 10 which is reboiled by steam reboiler E-6, effects further stripping of $CO_2$ out of the methanol due to relatively high temperatures, about 200° F., in the bottom of the stripper and due to the relatively low pressures, about 20 p.s.i.a. at the top of the stripper. The overhead of the stripper is comprised of a standard reflux system wherein the overhead vapors from the column are partially condensed in heat exchanger E-5 and the cooled reflux is returned to the column from the bottom of the reflux drum 44 via pump P-4 and line 46. $CO_2$ is withdrawn from the top of the reflux via line 48.

Stripped methanol is withdrawn from stripper 10 via line 40 and recirculated to the absorber via pump P-5. Water which has washed out absorbent rising upward in absorber 2 and which has absorbed some $CO_2$ is withdrawn from the absorber in line 6 and fed to the lower part of the stripper. Because of the relatively high temperatures in the bottom of the stripper, the absorbent vaporizes and passes up in the stripper 10 to be condensed in the cooler, upper part of the stripper and withdrawn in line 40. The more volatile $CO_2$ is not condensed in the upper part of the stripper but instead passes entirely through the stripper and is withdrawn in line 48 as previously indicated. Water which is the least volatile component in the stripper, is withdrawn in a purified state, that is, substantially free of methanol and $CO_2$, in line 50. The water is recirculated to absorber 2 via P-6 after it has been substantially cooled by cooling water in exchanger E-7.

Figure 2:
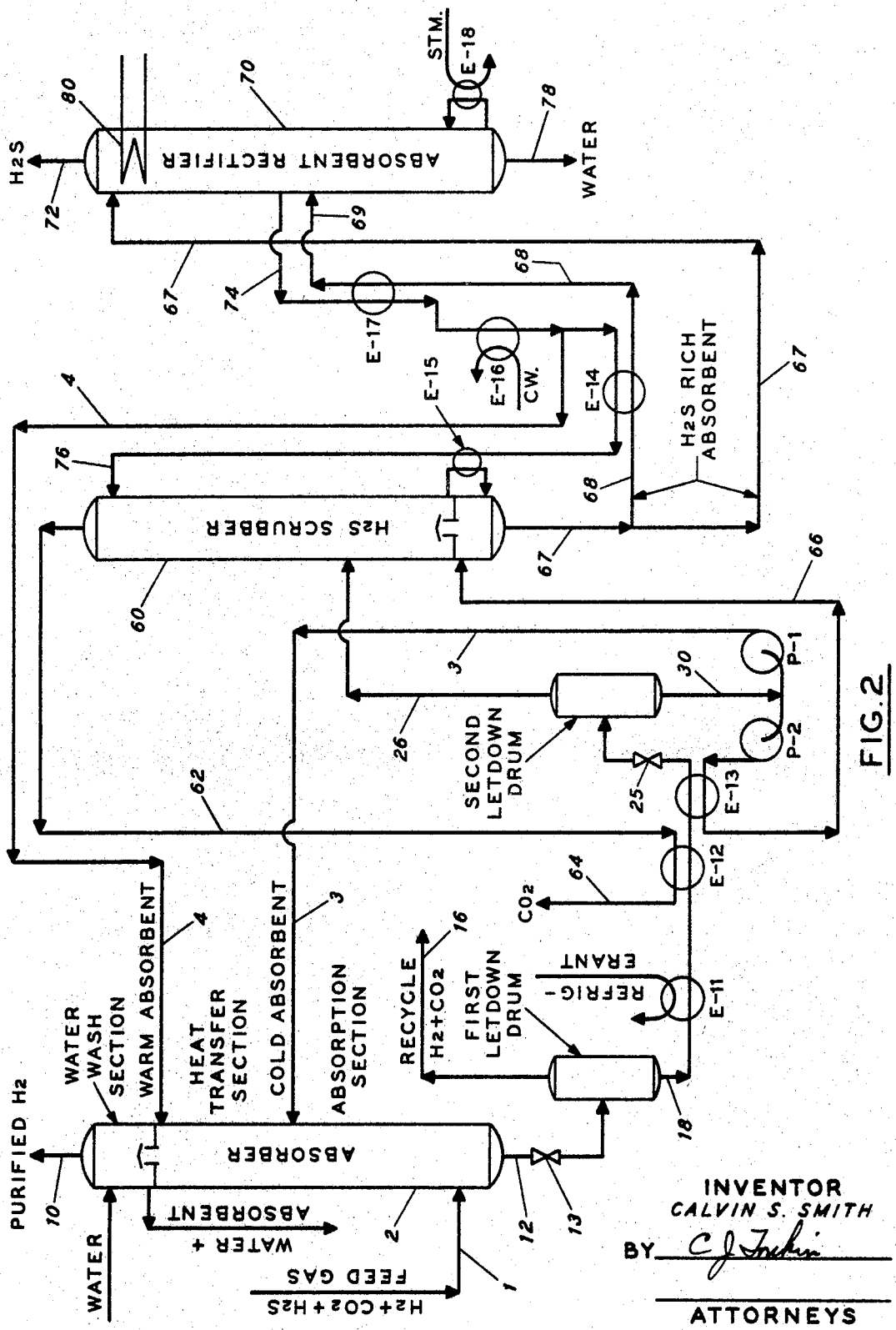
FIGURE 2 is a schematic illustration of the process of the present invention as applied to a feed gas comprising hydrogen, $CO_2$ and $H_2S$.

Referring now to FIGURE 2, a feed gas comprised of hydrogen, $CO_2$ and $H_2S$ obtained, for example, by partial oxidation of a sulfur-containing hydrocarbon followed by CO shift conversion to hydrogen and $CO_2$, is fed via line 1, at a pressure between 900 p.s.i.a. and 10,000 p.s.i.a., for example 1500 p.s.i.a., into the bottom of the absorber 2. The absorption section, heat transfer section, and water wash section of absorber 2 in FIGURE 2 operate similarly to those of the absorber in FIGURE 1 with the notable exception that in FIGURE 2, $H_2S$ is removed in addition to $CO_2$ in the absorption section. Purified hydrogen is withdrawn from the top of the absorber in line 10 and passed, for example, to a high pressure hydroconversion process, generally after removal or methanation of CO contained in the purified hydrogen withdrawn in line 10.

In the absorption section of absorber 2, $H_2S$ as well as $CO_2$ are absorbed and condensed at high pressure and then withdrawn from the bottom of the absorber via line 12 into the first letdown drum. Hydrogen plus $CO_2$, which is flashed from the rich methanol fed to the first letdown drum, is withdrawn in line 16 from the top of the first letdown drum and recycled back with compression to join feed gas in line 1.

The absorbent withdrawn in line 18 from the bottom of the first letdown drum is cooled in heat exchangers E-11, E-12 and E-13 and then passed through pressure reduction valve 25 into the second letdown drum at about 3-25 p.s.i.a. Cold, lean absorbent is withdrawn via line 30 from the bottom of the second letdown drum at about minus 90° F. and passed via line 3 into absorber 2.

A gaseous $CO_2$, $H_2S$ mixture flashed out of the methanol is removed from the top of the second letdown drum via line 26 and passed into $H_2S$ scrubber 60. $H_2S$ is scrubbed out of the gaseous $CO_2$, $H_2S$ mixture, and relatively pure $CO_2$ is removed from the top of the $H_2S$ scrubber via line 62 at about 10° F. After heat exchange in E-12, which may be combined with E-11, the $CO_2$ is withdrawn in line 64 at about 60° F.

The remaining part of the cold, lean methanol withdrawn in line 30 from the bottom of the second letdown drum is pumped via P-2 through exchanger E-13 and into $H_2S$ scrubber 60 via line 66. Because the $H_2S$ is much more soluble in the methanol absorbent than is $CO_2$, there is a considerably greater amount of $H_2S$ than $CO_2$ in the methanol absorbent passed via line 66 to the $H_2S$ scrubber. The greater solubility of $H_2S$ in methanol and also other hydrogen containing solvents, such as acetone, is probably due to loose hydrogen bonding. Thus $H_2S$ can be expected to be more soluble than $CO_2$ in any of the polar solvents containing hydrogen. Also, in addition to $H_2S$ being more soluble in the absorbent, because the $H_2S$ is less volatile than is $CO_2$, $H_2S$ concentrates in the bottom of the $H_2S$ scrubber at about minus 10° F., whereas the more volatile $CO_2$ leaves the top of the $H_2S$ scrubber at about 10° F. Reboiler heat to the $H_2S$ scrubber is provided by heat exchanger E-15. $H_2S$-rich methanol is withdrawn in line 68 from the bottom of the $H_2S$ scrubber and is heated by countercurrent heat exchange in heat exchangers E-14 and E-17. Operating process-wise in this manner, relatively pure $CO_2$ is obtained and the necessity of using an inert gas, such as nitrogen, to strip $CO_2$ from the absorbent, is avoided.

Part of the $H_2S$-rich methanol from the bottom of $H_2S$ scrubber 60 at about minus 10° F. is fed to absorbent rectifier 70 via line 67 entering the rectifier near the top. The remaining part of the $H_2S$-rich methanol from the bottom of $H_2S$ scrubber 60 is heated in heat exchangers E-14 and E-17 and fed to rectifier 70 below the rectified absorbent withdrawal line 74. An $H_2S$-rich gaseous stream containing at least 10 percent $H_2S$, and typically 15 to 30 volume percent $H_2S$ is withdrawn in line 72 from the top of the rectifier. The stream is suitable for feed to a Claus plant for production of sulfur.

As the methanol flows downward in absorbent rectifier 70, it is heated due to upward rising vapors generated by reboiler E–18, thus stripping $H_2S$ and residual $CO_2$ out of the absorbent. Rectified absorbent is withdrawn in line 74 from an intermediate point of absorbent rectifier 70. The rectified absorbent is substantially free of both $CO_2$ and $H_2S$. The upper part of rectifier 70 is provided with heat removal means, such as refrigerant cooled condenser 80. One preferable mode of operation is to thus remove heat from the upper part of rectifier 70 and feed all of the $H_2S$-rich methanol to rectifier 70 at a point below the rectified absorbent withdrawal.

After being cooled in heat exchanger E–17 by $H_2S$-rich methanol passing countercurrently through the exchanger as indicated by line 68 and also cooled by countercurrent cooling water in heat exchanger E–16, a part of the rectified absorbent at about 80° F. is passed via line 4 to an absorber 2. The remaining part of the absorbent is further cooled in heat exchangers E–14 and E–15 and passed via line 76 to the upper part of the $H_2S$ scrubber 60. This lean methanol absorbent, fed at about minus 30° F. via line 76 to the top of the $H_2S$ scrubber, scrubs $H_2S$ out of upward rising gases in the $H_2S$ scrubber.

The upper part of the $H_2S$ scrubber 60 is maintained at a pressure of about 16 p.s.i.a. The upper part of absorbent rectifier 70 is maintained at about 45 p.s.i.a. Water, which is the least volatile component in the methanol-$H_2S$-water feed to absorbent rectifier 70 via line 69, is withdrawn from the bottom of the absorbent rectifier via line 78. The water withdrawn in line 78, after cooling, is used as water wash for absorber 2 overhead, in a circuit similar to that described with respect to FIGURE 1.

It is apparent that the invention has broad application to the removal of $CO_2$ and other gases from gases which are not as highly soluble in polar solvents. Also, those skilled in the art will appreciate that the terms cold and warm are relative and thus the particular temperatures given in the detailed description wherein methanol was the example absorbent may vary for other solvents while still being relatively cold and warm for the particular solvent system set of temperatures. Although various specific embodiments of the invention have been described and shown, it is to be understood that they are meant to be illustrative only and not limiting. Certain features may be changed without departing from the spirit or essence of the invention. Accordingly, the invention is not to be construed as limited to the specific embodiments illustrated but only as defined in the following claims.

I claim:

1. In a process for removing $CO_2$ from a $CO_2$-rich gas stream containing at least one component having a boiling point lower than $CO_2$, by absorbing the $CO_2$ in the $CO_2$-rich gas stream fed to a lower point in an absorber using an absorbent at low temperatures and high pressures, the improvement which comprises:
    (1) feeding cold, $CO_2$-lean, liquid absorbent to an intermediate point in the absorber;
    (2) feeding warm, lean, liquid absorbent to an upper point in the absorber; and
    (3) directly contacting cold, $CO_2$-lean, gas, flowing upward in the absorber past said intermediate point, with warm, $CO_2$-lean, liquid absorbent flowing downward in the absorber so as to remove heat from the absorbent and warm the cold, $CO_2$-lean gas.

2. A process for removing $CO_2$ from $H_2$ which comprises:
    (1) absorbing $CO_2$ in a cold polar absorbent so as to obtain cold $CO_2$-lean $H_2$ and warm $CO_2$-rich absorbent;
    (2) reducing the pressure on the warm $CO_2$-rich absorbent to obtain cold gaseous $CO_2$ and cold $CO_2$-lean liquid absorbent;
    (3) heating and stripping further $CO_2$ from the cold $CO_2$-lean liquid absorbent to obtain warm $CO_2$-lean liquid absorbent;
    (4) feeding the warm $CO_2$-lean liquid absorbent to an upper section of the absorber; and
    (5) directly contacting the cold $CO_2$-lean $H_2$ rising upward in the absorber with the warm $CO_2$-lean liquid absorbent falling downward in the absorber to obtain $CO_2$-lean $H_2$ at a temperature of at least 15° F.

3. Process as in claim 2 wherein the absorbent is propylene carbonate.

4. Process as in claim 2 wherein the absorbent is acetone.

5. Process as in claim 2 wherein the absorbent is methanol.

6. Process according to claim 5 wherein the feed gas is an $H_2$ containing feed gas at a pressure between 900 p.s.i.a. and 10,000 p.s.i.a.

7. Process according to claim 6 wherein the temperature of the feed gas is between 70° F. and 130° F. the temperature of the warm $CO_2$-rich methanol is between 50° F. and 110° F., the temperature of the cold $CO_2$-lean liquid methanol is between −30° F. and −110° F., and the temperature of the warm $CO_2$-lean methanol is between 50° F. and 110° F.

8. In a process for removing $CO_2$ and $H_2S$ from a $CO_2$ and $H_2S$-rich gas stream containing at least one component having a boiling point lower than $CO_2$ and $H_2S$, by absorbing the $CO_2$ and $H_2S$ in the $CO_2$ and $H_2S$-rich gas stream fed to a lower point in an absorber using an absorbent at low temperatures and high pressures, the improvement which comprises:
    (1) feeding cold lean liquid absorbent to an intermediate point in the absorber;
    (2) feeding warm lean liquid absorbent to an upper point in the absorber; and
    (3) directly contacting cold $CO_2$ and $H_2S$-lean gas, flowing upward in the absorber past said intermediate point, with warm lean liquid absorbent flowing downward in the absorber so as to remove heat from the absorbent and warm the cold $CO_2$ and $H_2S$-lean gas to a temperature of at least 15° F.

9. Process according to claim 8 wherein the feed gas is an $H_2$ containing gas at a pressure between 900 p.s.i.a and 10,000 p.s.i.a.

10. A process for removing $CO_2$ and $H_2S$ from an $H_2$ containing feed gas which comprises:
    (1) absorbing the $CO_2$ and $H_2S$ in an absorber with a cold $CO_2$, $H_2S$-lean polar absorbent obtained as described in step 2, so as to obtain a cold $CO_2$, $H_2S$-lean, $H_2$-rich gas stream and warm $CO_2$, $H_2S$-rich absorbent;
    (2) reducing the pressure on the warm $CO_2$, $H_2S$-rich absorbent so as to obtain a cold gaseous $CO_2$ and $H_2S$ stream, and the cold $CO_2$, $H_2S$-lean absorbent used to absorb $CO_2$ and $H_2S$;
    (3) scrubbing $H_2S$ from the cold gaseous $CO_2$ and $H_2S$ stream using lean absorbent obtained as described in step 4, so as to obtain a $CO_2$-rich gaseous stream and $H_2S$-rich absorbent;
    (4) rectifying the $H_2S$-rich absorbent to obtain the lean absorbent used to scrub $H_2S$ and a gaseous $H_2S$-rich stream and a water stream;
    (5) directly contacting the cold $CO_2$ $H_2S$-lean, $H_2$-rich gas stream rising upward in the absorber with the warm $CO_2$, $H_2S$-lean absorbent stream flowing downward in the absorber.

11. Process as in claim 10 wherein the absorbent is methanol.

12. Process according to claim 10 wherein the feed gas is at a pressure between 900 p.s.i.a. and 10,000 p.s.i.a.

13. Process according to claim 12 wherein the temperature of the feed gas is between 70° F. and 100° F., the temperature of the warm $CO_2$ $H_2S$-rich methanol is between 50° F. and 110° F., the temperature of the cold $CO_2$, $H_2S$-lean methanol is between −30° F. and −110°

F., and the temperature of the warm $CO_2$ $H_2S$-lean methanol is between 50° F. and 110° F.

References Cited

UNITED STATES PATENTS

| | | | |
|---|---|---|---|
| 2,756,841 | 7/1956 | Asendorph | 55—68 X |
| 2,781,862 | 2/1957 | Fussman | 55—68 X |
| 2,863,527 | 12/1958 | Herbert et al. | 62—17 X |
| 2,926,751 | 3/1960 | Kohl et al. | 55—68 X |

REUBEN FRIEDMAN, *Primary Examiner.*

R. W. BURKS, *Assistant Examiner.*

U.S. Cl. X.R.

55—48, 73, 94